C. R. PELTON AND J. A. HAND.
ELECTRIC SWITCH.
APPLICATION FILED JULY 31, 1920.

1,397,777. Patented Nov. 22, 1921.

Inventor
Chauncey R. Pelton,
Jay A. Hand
By Stuart C. Barnes
Attorney

UNITED STATES PATENT OFFICE.

CHAUNCEY R. PELTON AND JAY A. HAND, OF DETROIT, MICHIGAN, ASSIGNORS TO THE PELTON & CRANE COMPANY, OF DETROIT, MICHIGAN, A CORPORATION OF MICHIGAN.

ELECTRIC SWITCH.

1,397,777.   Specification of Letters Patent.   Patented Nov. 22, 1921.

Application filed July 31, 1920. Serial No. 400,349.

*To all whom it may concern:*

Be it known that we, CHAUNCEY R. PELTON and JAY A. HAND, citizens of the United States, residing at Detroit, in the county of Wayne and State of Michigan, have invented certain new and useful Improvements in Electric Switches, of which the following is a specification.

This invention relates to switches to be used in connection with heating appliances. The switch is designed specifically for use with a sterilizer but is capable of more general application in its broader aspects.

Automatic switches have heretofore been used with heating appliances but they have been open to the objection that in most of them the thermostat has either been a part of the cut-out switch *per se* or else the thermostat has been used as a catch to retain the switch closed, resulting in strains that bent the thermostat and gave it a permanent set other than originally intended and hence make it unreliable.

It is the object of the present invention to afford a switch, which is very delicately but reliably held so that a minimum stress by the thermostat will initiate its opening, and which puts the thermostat under strain only when a temperature is reached near the temperature at which it acts. This is accomplished by the use of toggle levers maintained substantially on their center line or just over by the pull that serves to snap the switch open when the thermostat initiates the breaking of the toggle.

In the drawings,—

Figure 1:
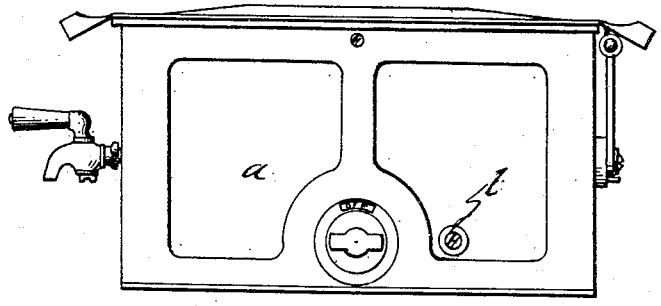
Figure 1 is a front elevation of a sterilizer for dental instruments, showing the setting button for the automatic switch.
Figure 2:
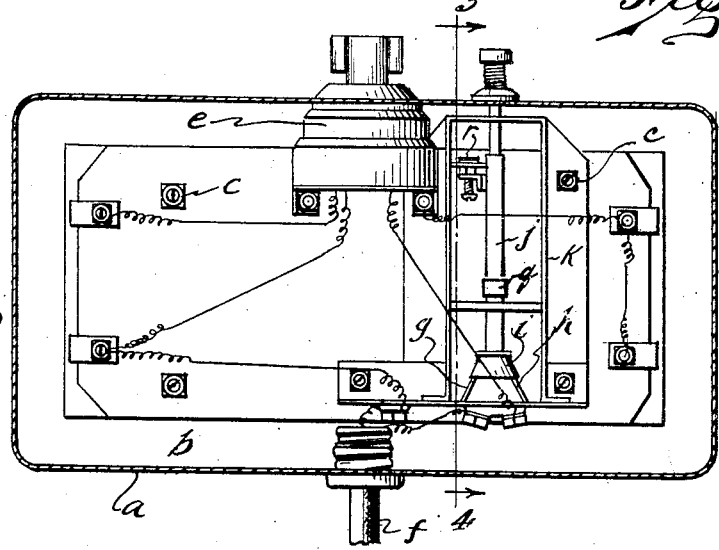
Fig. 2 is an inverted plan view of the sterilizer showing the automatic switch.
Figures 3, 4:
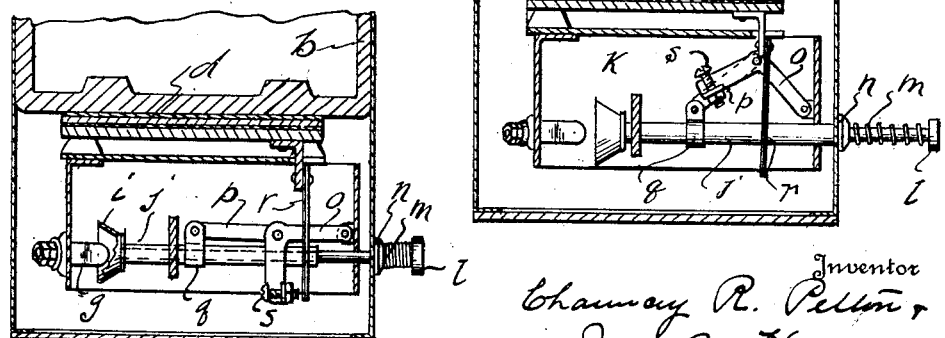
Fig. 3 is a cross section on the line 3—4 of Fig. 2.
Fig. 4 is a similar section showing the automatic switch open.

The switch is shown used with a sterilizer for dental instruments. Of this apparatus, $a$ is the outer shell, $b$ the basin, to the bottom of which is secured by threaded studs and nuts $c$ the heating unit $d$, provided with a suitable resistance coil (not shown). A hand switch $e$ serves to control the heating element by switching on more or less coils in the heating element or completely cutting off all the coils. This is old construction and need not be described any further.

It will be noted that interposed in the line from the flexible electric conduit $f$ are a pair of spring finger terminals $g$ and $h$ which can be connected by a copper bridge $i$ in the form of a cup carried upon the end of a stem $j$. This stem is guided in reciprocating movement in the box-like hanger $k$ which is secured to the bottom of the basin $b$ by the same threaded stud and nuts $c$, which secure the heating element to the basin. The stem protrudes through the front of the shell $a$ and is provided with a knob $l$. A coiled spring $m$ is coiled about the stem between the knob $l$ and the thimble $n$ and normally tends to thrust the stem $j$ outwardly and break the circuit through the switch. However, the stem $j$ may be pushed in and it will be firmly held against opening by the thrust of the spring. This action is secured by the two toggle arms $o$ and $p$. One —$o$— is pivoted to the hanger $k$, the other —$p$— is pivoted to a clip $q$ attached to the stem $j$. A straight line through the two pivots is substantially parallel to the axis of the stem $j$. Hence when the stem $j$ is pushed in it will only be stopped when the toggle arms assume a straight line. That straight line being substantially parallel to the axis of the stem, the thrust of the spring on the toggle arms is simply a thrust on a dead center or tends to force the toggle arms against the stem $j$ and never will open the toggle. The spring retains the toggle arms substantially in a straight line through the three pivots.

But when in this position the most delicate movement, which has a component at right angles to the straight line through the three pivots, will break the toggle, when applied at the center pivot or knee. It may be well described as a hair trigger movement. Now this movement is supplied by the bowing of the thermostat $r$, constructed of metals of different co-efficients of expansion. The thermostat bows in as the temperature increases and at a given temperature, determined by the adjustment of the screw $s$ on the end of the bell crank toggle arm $o$, touches and stresses the bell crank arm with a hair trigger movement, breaks the dead center and then the spring $m$ comes into play. With a snappy, positive action it pulls the stem $j$ out and opens the switch.

The value of this switch will be evident. The strain on the thermostat is a minimum, hence it in no way becomes distorted or set so as to be variable with usage. The switch action is quick and positive and brought about solely by the energy stored in the spring.

The cup-shaped bridge centers the contacts and at the same time offers no resistance to the opening of the switch, yet affords the necessary pressure with the spring contacts to give a good electrical connection.

What we claim is:

1. A thermal cut-out, having in combination, a bridge for a switch, a pair of toggle arms coupled up with the bridge and when in substantially straight line position holding the bridge against a tendency to move into open position, and a thermostat arranged to apply movement at the knee of the toggle solely to break the same and allow the bridge independently of the energy of the thermostat to move into open position.

2. A thermal cut-out, having in combination, a bridge, a spring tending to move said bridge into open position, a pair of toggle arms resisting such movement when in substantially their straight line position, and a thermostat arranged to apply a stress to the toggle at the knee solely to trip the toggle and let the energy of the spring move the bridge.

3. A thermal cut-out, having in combination, a bridge, a spring tending to move said bridge into open position, a pair of toggle arms maintained substantially upon dead center by the thrust of the spring and opposing the opening of the bridge and thermally responsive means for stressing the toggle at the knee solely for breaking the same.

4. A thermal cut-out, having in combination, a bridge, a reciprocating stem carrying the bridge, a pair of toggle arms connected with the stem having two pivots in a line substantially parallel with the axis of the stem, a spring tending to project the stem outward along its axis to move the bridge into open position, and thermally responsive means for stressing the toggle at its knee when a given temperature is reached to trip the toggle and allow the spring to move the bridge.

5. A thermal cut-out, having in combination, a bridge, a longitudinally-guided stem carrying the bridge, a spring for projecting the stem along its axis to move the bridge into open position, a toggle arm pivotally supported upon a stationary pivot, another toggle arm connected thereto and supported on a pivot carried by the stem, the line through the pivots being substantially parallel to the axis of the stem, and thermally responsive means for stressing the toggle at the knee to trip the same when a determined temperature is reached.

6. A thermal cut-out, having in combination, a bridge, a stem slidable longitudinally and carrying the bridge, a spring for projecting the stem and moving the bridge into open position, a pair of toggle arms resisting the movement of the stem by the spring and stressed by the spring-pressed stem on substantially dead center, and thermally responsive means for stressing the toggle at the knee to trip the same when a determined temperature is reached.

7. A thermal cut-out, having in combination, a bridge, a stem carrying the bridge and slidable longitudinally, a spring coiled about the stem for thrusting the stem out to move the bridge into open position, a pair of toggle arms resisting this movement by assuming a dead center position, one of the arms being a bell crank, and a thermostat for stressing the bell crank when a given temperature is reached.

8. A thermal cut-out, having in combination, a bridge, a stem carrying the bridge and slidable longitudinally, a spring for thrusting the stem out to move the bridge into open position, a pair of toggle arms, one a bell crank resisting this movement by assuming a dead center position, an adjustable contact screw on the end of the bell crank arm, and a thermostat for stressing said screw.

In testimony whereof we affix our signatures.

CHAUNCEY R. PELTON.
JAY A. HAND.